No. 725,347. PATENTED APR. 14, 1903.
D. H. LANGAN.
CANT HOOK.
APPLICATION FILED AUG. 30, 1902.
NO MODEL.
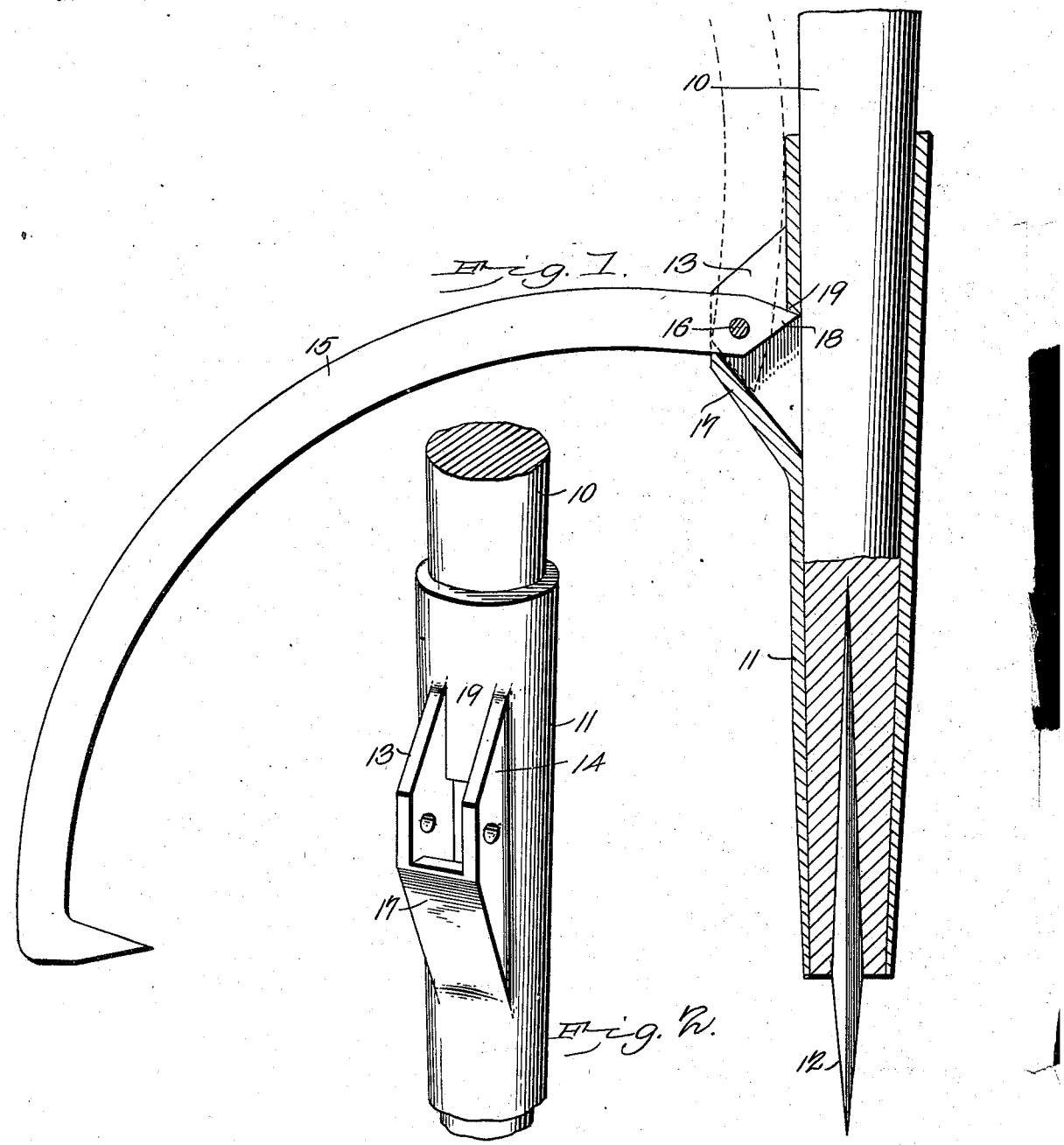

UNITED STATES PATENT OFFICE.

DAVID HUIT LANGAN, OF GAINES, PENNSYLVANIA.

CANT-HOOK.

SPECIFICATION forming part of Letters Patent No. 725,347, dated April 14, 1903.

Application filed August 30, 1902. Serial No. 121,651. (No model.)

*To all whom it may concern:*

Be it known that I, DAVID HUIT LANGAN, a citizen of the United States, residing at Gaines, in the county of Tioga and State of Pennsylvania, have invented a new and useful Cant-Hook, of which the following is a specification.

This invention relates to cant-hooks employed by lumbermen and others for handling logs, timber, and the like, and has for its object the production of a simply-constructed attachment, whereby the hook is supported in the proper position and the strains so uniformly distributed that the parts will not become unevenly worn, and thus permit the hook to drop too far downward and interfere with its action; and the invention consists in a support for the cant-hook having two reversely-disposed shoulders, between which the hook is movably supported by one of the shoulders, and providing the hook with an extension engaging the other of the shoulders at the same time, whereby the hook is supported both in the rear and forward of the pivot-bolt and the strains thus distributed and all tendency to unequal wear obviated.

Other objects of the invention will appear in the annexed description and be specified in the claims following.

In the drawings illustrative of the invention, Figure 1 is a sectional side elevation of the socket member and the lower portion of the handle of a cant-hook with the improvement applied. Fig. 2 is a perspective view of the socket and cant-hook-supporting ears.

This device may be applied to any of the ordinary peavey cant-hooks, either the form wherein the peavey-hook is connected to a socket embracing the whole lower end of the handle member and forming the support for the pike or wherein the peavey-hook is supported in a separate ferrule; but for the purpose of illustration the device is shown attached to one of the former class, to which it is particularly applicable; but while this may be the preferred manner of employing the improved device, I do not wish to be limited to any particular construction of handle, ferrule, or socket, as the improvement is equally applicable to all the various forms of cant-hooks manufactured.

The handle member is represented at 10, the socket at 11, and the pike at 12, these parts being of the usual construction.

When the device is employed in connection with a socket, as at 11, extending-ears 13 14 will be formed thereon and the peavey-hook 15 pivoted between the ears by a bolt 16. The lower portions of the ears 13 14 are united by a traverse web 17, which forms a shoulder to support the peavey-hook in advance of its pivot-bolt 16, as shown in Fig. 1, while the portion of the socket 11 between the upper portions of the ears 13 14 forms another shoulder, 19, with which an extension 18 on the rear end of the peavey-hook engages, as shown in Fig. 1. It will thus be noted that while the hook is limited in its downward movement by the coaction of the reversely-disposed shoulders it is free to be elevated to a position in close proximity to the handle member above the socket, thus providing for the greatest possible range of action of the hook.

The extension 18 will preferably be inclined upon both sides, the inclined lower side designed to permit the upward movement of the hook until it lies close to the handle member, as indicated by dotted lines in Fig. 1, by engaging the inner surface of the lower shoulder 17, as will be obvious. By this simple arrangement the peavey-hook is supported both forward of and in the rear of its pivot-bolt, thereby dividing the strains and wear between the two shoulders 17 19, so that the wear of the hook upon its supporting means is reduced to a minimum and all danger of the sagging of the hook caused by the wearing of its supports practically eliminated.

Before the hook can sag both of the shoulders 17 and 19 must wear away equally by the friction, and before this double wearing action will be sufficient to cause the hook to sag to an appreciable extent the other parts of the implement will be worn out. By this improved arrangement, therefore, the cutting of the jaw 17 by the friction of the hook 15 is obviated, as the downward strains on the forward jaw or shoulder are divided and borne equally by the two shoulders. This is a very important feature of the invention and adds materially to the durability, efficiency, and consequent value of the implement, as by this simple means the hook 15 is supported in position for action and will be constantly maintained in such position.

The presence of the improvement does not interfere in any manner with the free action of the hook and does not add to the expense or cost of manufacture, as neither the labor nor material is increased.

As before stated, the device may be employed in connection with any of the ordinary forms of cant-hooks and may be modified as to the proportionate sizes of the parts, as required.

In the ordinary form of structure with the strains borne entirely between the shoulders 17 and the pivot-bolt 16 a very strong leverage is exerted upon the pivot-bolts by the longer outer end of the hook, frequently resulting in either bending the pivot-bolt out of alinement or breaking it.

In the improved device the pivot-bolt is relieved very largely from lateral strains, as the pressures are absorbed by the reversely-acting shoulders. This is also a very important feature of the invention.

The socket or ferrule portions of devices of this character are generally formed of malleable iron and the hook portions of steel; but the parts may be made of any suitable material and modified in minor particulars without departing from the principle of the invention or sacrificing any of its advantages.

Having thus described the invention, what is claimed is—

1. In a cant-hook, a handle member, the peavey-hook pivotally engaging the handle member and with an extension in the rear of its pivot, a shoulder carried by said handle member adapted to engage the peavey-hook from one side in advance of its pivot, and a reversely-disposed shoulder adapted to engage said extension from the opposite side in the rear of said pivot, substantially as described.

2. In a cant-hook, the handle member carrying spaced ears having an exterior shoulder and a reversely-disposed interior shoulder, and a peavey-hook movably supported between said ears and engaging said exterior shoulder and with an extension engaging said interior shoulder, whereby the strains are distributed and the downward movement of the hook limited and its upward movement unobstructed, substantially as described.

3. In a cant-hook, a socket for the handle member having spaced ears with an exterior shoulder and a reversely-disposed interior shoulder, and a peavey-hook movably supported between said ears and engaging said exterior shoulder and with an extension engaging said interior shoulder, whereby the downward movement of the hook is limited, and its upward movement unobstructed, substantially as described.

4. In a cant-hook, the handle member carrying spaced ears with an exterior shoulder and a reversely-disposed interior shoulder, and a peavey-hook movably supported between said ears and engaging said exterior shoulder and with an extension provided with reversely-inclined surfaces with one of said surfaces engaging said interior shoulder and the other of said surfaces engaging the rear of said exterior shoulder when the hook is elevated, whereby the strains are distributed and the downward movement of the hook limited and its upward movement unobstructed, substantially as described.

In testimony that I claim the foregoing as my own I have hereto affixed my signature in the presence of two witnesses.

DAVID HUIT LANGAN.

Witnesses:
J. A. KELLEY,
WILLIAM G. KLINE.